June 1, 1926.
J. A. BRIED
1,586,942
CHILD'S TODDLER TYPE OF VEHICLE
Filed Jan. 29, 1925
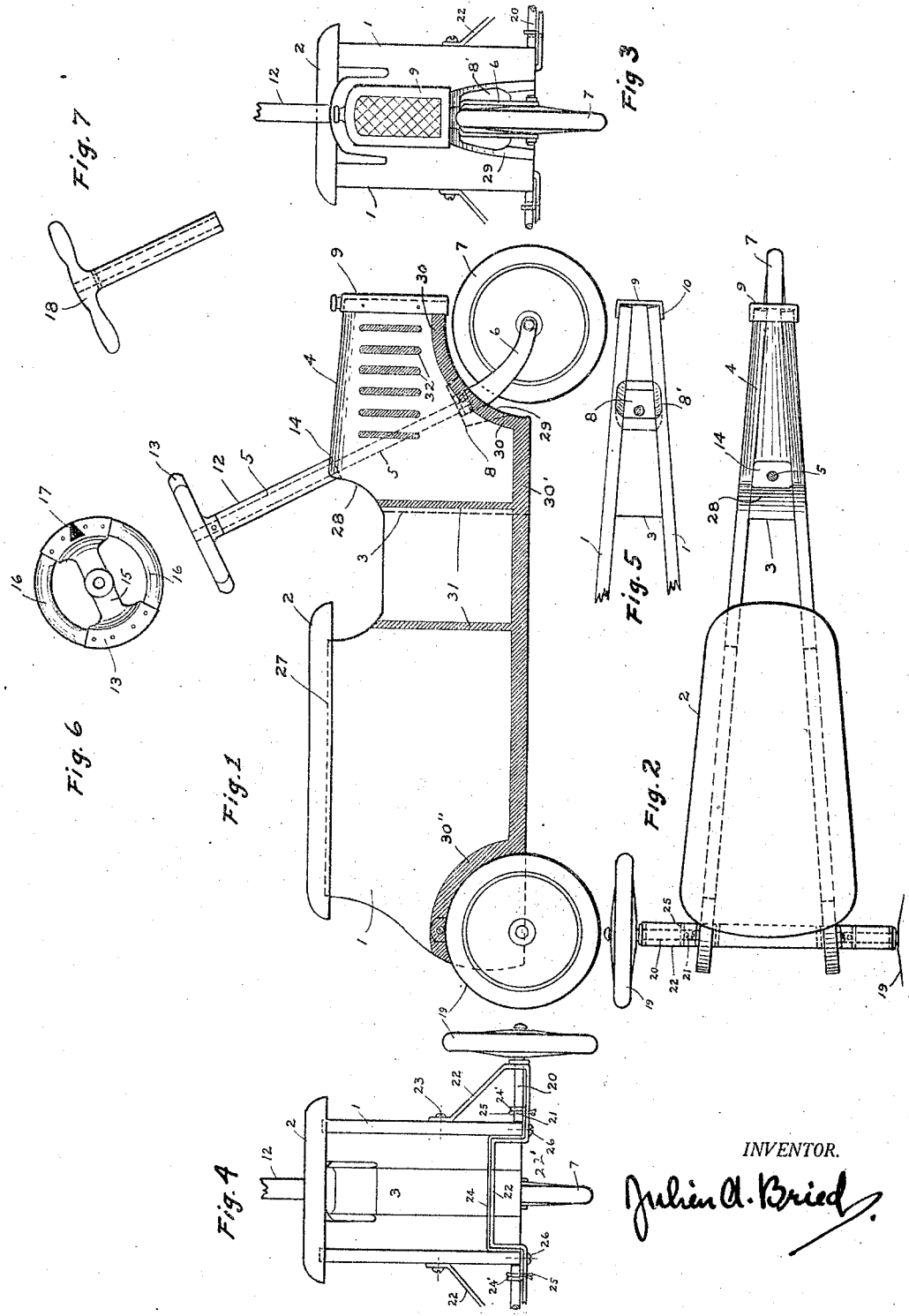
INVENTOR.
Julien A. Bried Patented June 1, 1926.

1,586,942

UNITED STATES PATENT OFFICE.

JULIEN A. BRIED, OF OAKLAND, CALIFORNIA.

CHILD'S TODDLER TYPE OF VEHICLE.

Application filed January 29, 1925. Serial No. 5,611.

This invention relates to children's toddler vehicles, and it has to do with improved construction whereby such cars will resemble an automobile yet function like a standard kiddie-kar wherein a small child toddles along the floor while seated astride the vehicle in the well known manner.

Before describing my improvements it may be well to show their significance by drawing attention to the fact that on account of the general use of automobiles the natural desire of even the very small child or baby is to own one, and this desire corresponds to our own desires in childhood to own a toy horse or wagon, the then common means of transportation.

Notwithstanding this yearning of the very small child and the fact that toy automobiles are provided for larger children to ride in, no successful attempt has been made to satisfy the desire by giving automobile characteristics to the three-wheeled toddler vehicles as used by very small children.

This is perhaps due to the fact that extreme cheapness is an important factor and elaborateness of construction would not be permissible.

My construction on the contrary accepts the standard three-wheeled feature of these vehicles yet brings into working relation thereto, in a cheap construction, the necessary automobile features.

In the drawing, Figure 1 is a side elevation of my improved vehicle, Figure 2 a plan view, Figure 3 a front elevation, Figure 4 a rear elevation, Figure 5 a bottom view of the front portion of the body only showing the concealed recess forming the steering head support, Figure 6 a plan view of the steering wheel, and Figure 7 a front view of an optional steering cross arm post which may be used in place of the steering wheel in some cases.

In the drawings it will be seen that the vehicle comprises two vertical side boards 1 sawed out in the general shape of an automobile, laterally spaced from one another and with a plain seat 2 secured to their upper edges. This seat is in plan of the general form of an automobile roof, as shown in Figure 2, and the sides are spaced apart in front by a tapered block 3 which gives the sides a gentle taper simulating the lines of an automobile, especially at the forward or hood end 4.

The block 3 not only spaces the sides to give the substantial body lines to the vehicle, but functions distinctly for two other purposes; 1st, to provide through means of a long drilled hole a long support for a steering head 5 extending from a front fork 6 which revolvably carries a front supporting wheel 7, and 2nd, to provide a concealed recess between the side boards 1 forming a bearing 8 for the upper end of the fork itself to carry the weight of the rider and permit the fork to turn for steering the vehicle.

Figure 5 shows this recess 8 and the additional notching of the sides at 8' so as to clear the sides of the fork for turning.

By giving the fork 6 a rake or forward bend to its extreme lower ends out of line with its main steering head axis, as shown in Figure 1 it tends to automatic tracking and also provides for emergence of the steering post at the cowl juncture with the hood so as to keep the top of the hood clear, more like a regular automobile.

The front ends of the side boards 1 when secured against the wedge block 3 will, due to the square cut edges of the boards, ordinarily be at an angle with the front end of the block, and while this may be leveled off by another operation I provide a sheet metal cap 9 simulating a radiator and having side and top edges 10 overlapping the sides and top of the front end of the body, thereby providing a simple finish to the front end, the cap or radiator being secured to the body by a couple of brads or otherwise.

The front fork 6 has a rod or steering head 5 extending upwardly at an angle as shown and surrounding the rod is a spool 12 simulating a steering post and surmounted by a steering wheel 13 suitably secured to the upper end of the rod. At its lower end the spool bears squarely against a notch 14 formed on the edge of the wedge block so as to provide a good bearing for these parts to move upon one another, the block being of a dimension preferably to receive a washer at the under end of the spool and at the top of the fork.

The steering wheel is formed with a central arm 15 only connecting the rim longitudinally of the vehicle so as to form two places only 16, 16 for the child's hands to grip the rim.

These places 16 are disposed at opposite sides only of the rim, and at the forward top center of the rim in line with the arm 15 is a black or other colored spot 17 or other direction indicating device. The arrangement described makes a steering wheel practicable for almost a baby's use for the hands find each a definite natural position at which the vehicle is guided straight ahead, and the addition of the spot 17 quickly trains a small child in correct guidance as it soon finds that the vehicle turns in the same direction as does the directing device or spot.

This construction therefore makes it possible for a small child to guide the vehicle by means of a steering wheel closely resembling a common automobile steering wheel, tho if required in some special case a T arm steering post 18 as shown in Figure 7 may be substituted for the wheel and spool 12.

The rear end of the vehicle is supported by two wheeels 19 preferably the standard kiddie-kar wheels as supplied each permanently secured to a stub shaft 20 on which they are freely revolvable. The stub shafts each have a hole drilled through them near the end at 21, and the stub shafts are mounted to the vehicle by extending through a flat metal brace or rear axle 22 bent in the form shown in Figure 4 and secured against the outside of each side by the screws 23.

This brace by extending upwardly at 22' stiffly braces the spaced sides against inward collapse, and the ends of the stub shafts touching hard against the outside of the sides aid in preventing outward movement, while an auxiliary strap 24 lying parallel on the brace 22 is provided with upturned ends 24' drilled to pass the inner ends of the stub shafts 20 and a cotter pin 25 passing through the hole in each shaft and both brace and strap holds the shaft from rotation and pulling out.

A screw 26 is also provided to extend through both brace and strap into the lower edge of each side board as shown.

The upper edge of the sides are preferably let into the under side of the seat as shown at 27 and secured thereto.

In contemplating Figure 1 it should be observed that the cut out portion 28 forms a cowl for the automobile body, and the curved cut out 29 over the front wheel comes close to the wheel, on account of the upper end of the fork being in a recess, and thus simulates front fenders, and in order to aid the structural lines optical effects are combined with the mechanical form and a dark band 30 is formed on both sides to follow the curve 29 and also extend at 30' along the lower edge of the sides to suggest runboards, then extend rearward in the form of a curve 30'' substantially concentric with the rear wheels to simulate rear fenders and from there entirely over the lower rear ends of the sides so as to absorb as it were the exposed brace 22 into a general shadow.

Also at 31 are two vertical lines designating a front door, and at 32 spaced lines designating the ventilating slots in the hood.

In thus describing my invention it should be noted that I am fully aware of the great variety of toy vehicles extant, but I am not aware of any successful attempt to give automobile characteristics to a three-wheeled toddler vehicle having the simplicity of construction or the other advantages described.

I claim:—

1. A child's vehicle of the character described comprising a body simulating an automobile in side elevation, a single wheel supporting the front end of the vehicle and two wheels supporting the rear end thereof, said front wheel being carried on a front fork positioned under the hood portion of the vehicle and between the prongs of said fork.

2. In a child's vehicle of the character described, a body comprising a pair of vertically arranged boards laterally spaced, a road wheel at the front end of the body, a pair of road wheels at the rear end of the body, a metal strap secured to and passing under the body from one rear wheel to the other and supporting the rear wheels, and said strap having a portion thereon arranged to hold the said boards in spaced relation.

3. In a child's vehicle of the character described, a body comprising a pair of vertically arranged boards laterally spaced, a road wheel at the front end of the body, a pair of road wheels at the rear end of the body, a metal strap secured to and passing under the body from one rear wheel to the other and supporting the rear wheels, and said strap having a portion arranged to hold the said boards in spaced relation and with the extreme ends of the strap being secured respectively to the outer sides of the said boards.

4. In a child's vehicle of the character described, a body comprising a pair of vertically arranged laterally spaced boards, a road wheel at the front end of the body, a pair of road wheels at the rear end of the body, and means supporting the rear wheels to the body comprising a metal strap extending across under the body from wheel to wheel and thence at an upward angle to both outer sides of the body.

5. In a child's vehicle of the character described, a body comprising a pair of vertically arranged laterally spaced boards, a road wheel at the front end of the body, a pair of road wheels at the rear end of the body each mounted on stub axles, and means supporting the rear wheels to the body comprising a metal strap extending across under the body from wheel to wheel, thence embracing the stub axles and returning to the sides of the body boards and being secured thereto.

6. A child's vehicle of the character described comprising a body shaped in side elevation to simulate an automobile and consisting of two vertical side pieces spaced laterally at the forward end of the vehicle by a block secured between the vertical side pieces, a pair of wheels at the rear end of the body, and a single wheel only at the front end supported wholly by said block.

7. A child's vehicle of the character described comprising a body formed of two vertically arranged side pieces spaced laterally at the forward end of the vehicle by a block secured between them, a pair of wheels at the rear end of the body, and a wheel at the front end of the body carried in a fork, said block being notched between the vertical sides to form a recess in which the upper end of the fork is seated and to receive the thrust of the same.

8. A child's vehicle of the character described comprising a body shaped to simulate in side elevation an automobile and consisting of two vertically arranged side members spaced laterally, road wheels supporting the rear end of the body, and a road wheel at the front end of the body, a front fork between which the front road wheel is revolvably secured and the upper end of said fork being supported for thrust at a point between the said side members above the lower edge of the same and concealed thereby.

9. In a child's vehicle of the character described, a body having vertically arranged side board members laterally spaced by a block secured therebetween, a steering post for the front wheel of the vehicle extending through the block and having rotative bearing therein, a sleeve surrounding the upper part of said post resting on top of said block, and a hand steering wheel secured to the post above the sleeve.

10. In a child's vehicle of the character described, a steering wheel provided with two definite positions only for the hands of a child rider, one position at each opposite side of the vehicle on a line at right angles to the medial line of the vehicle when the steering wheel is adjusted to travel straight ahead, and said wheel being provided with a direction indicating device midway between the gripping portions thereof.

11. In a structure as defined in claim 10, said device being a spot formed on the forward portion of the steering wheel rim.

12. In a child's vehicle of the character described, a steering wheel provided with a gripping rim and a spot thereon adapted to fall on the medial line of the vehicle when the steering wheel is turned to direct the vehicle straight ahead.

13. A child's vehicle of the character described comprising a body formed of a vertically disposed board cut out in simulation of an automobile when viewed in side elevation, and a radiator simulating cap secured over and covering the front end of the board.

14. A child's vehicle of the character described comprising a body formed of two vertically disposed boards laterally spaced at the front end of the body by a block and all cut out in simulation of an automobile when viewed in side elevation, and a radiator simulating cap secured over the front ends of both boards and block.

15. In a child's vehicle of the character described, a steering wheel provided with two definite positions only for the hands of a child rider, one position at each opposite side of the vehicle on a line at right angles to the medial line of the vehicle when the steering wheel is adjusted to make the vehicle travel straight ahead.

JULIEN A. BRIED.